(12) United States Patent
Swanson et al.

(10) Patent No.: US 10,762,449 B2
(45) Date of Patent: Sep. 1, 2020

(54) REAL-TIME DETERMINATION OF A SERVICE COST

(71) Applicant: Pathology Associates Medical Laboratories, LLC, Spokane, WA (US)

(72) Inventors: Mathew Norman Swanson, Cheney, WA (US); Timothy Scott Byers, Spokane, WA (US); Mark Thomas LaVoie, Colbert, WA (US); Stephen Skylar Soom, Spokane Valley, WA (US); Stephanie Cecelia Filice, Veradale, WA (US)

(73) Assignee: Pathology Associates Medical Laboratories, LLC, Spokane, WA (US)

( * ) Notice: Subject to any disclaimer, the term of this patent is extended or adjusted under 35 U.S.C. 154(b) by 632 days.

(21) Appl. No.: 15/009,620

(22) Filed: Jan. 28, 2016

(65) Prior Publication Data

US 2017/0221112 A1 Aug. 3, 2017

(51) Int. Cl.
*G06Q 10/06* (2012.01)
*G06Q 30/04* (2012.01)
*G06Q 30/02* (2012.01)

(52) U.S. Cl.
CPC ......... *G06Q 10/06* (2013.01); *G06Q 30/0283* (2013.01); *G06Q 30/04* (2013.01)

(58) Field of Classification Search
CPC ..... G06Q 10/06; G06Q 30/0283; G06Q 30/04
See application file for complete search history.

(56) References Cited

U.S. PATENT DOCUMENTS

| | | | | |
|---|---|---|---|---|
| 4,887,206 A | * | 12/1989 | Natarajan | G06Q 10/06 700/107 |
| 5,793,632 A | * | 8/1998 | Fad | G06Q 30/0283 700/90 |
| 7,444,436 B2 | * | 10/2008 | Wille | G06Q 20/346 710/10 |
| 2002/0143418 A1 | * | 10/2002 | Ohara | G06Q 10/06 700/95 |
| 2003/0018503 A1 | * | 1/2003 | Shulman | G06Q 10/06 705/35 |
| 2003/0115163 A1 | * | 6/2003 | Moore | G06Q 30/0283 705/500 |
| 2005/0144125 A1 | * | 6/2005 | Erbey | G06Q 20/023 705/40 |

(Continued)

OTHER PUBLICATIONS

Ninci, Antonella, and Robert Ocakacon. "How much do lab tests cost? Analysis of Lacor Hospital laboratory services." (2004).*

*Primary Examiner* — Asfand M Sheikh
(74) *Attorney, Agent, or Firm* — Lee & Hayes, P.C.

(57) ABSTRACT

This disclosure describes, in part, systems and techniques for retrieving complex data from multiple data sources corresponding to a current cost of consumable materials and a current cost of labor used to provide a service. Once retrieved, the system may determine a total current cost of the consumable materials and a total current cost of the labor. Furthermore, the system may use the total current cost of the consumable materials and the total current cost of the labor to determine an overall current cost of the service. The system may simultaneously provide an overall current cost of multiple services.

19 Claims, 7 Drawing Sheets

(56) References Cited

U.S. PATENT DOCUMENTS

| | | | | |
|---|---|---|---|---|
| 2006/0200428 A1* | 9/2006 | Javli | G06Q 10/06 705/400 |
| 2006/0242089 A1* | 10/2006 | Vahidi | G06Q 10/10 705/400 |
| 2007/0203857 A1* | 8/2007 | Hagen | G06Q 10/06 705/400 |
| 2007/0271203 A1* | 11/2007 | Delvat | G06Q 10/06 705/400 |
| 2008/0146200 A1* | 6/2008 | Martin | H04M 3/436 455/413 |
| 2010/0179853 A1* | 7/2010 | Garcia | G06Q 10/06 705/7.12 |
| 2011/0213631 A1* | 9/2011 | Mislavsky | G06Q 10/06 705/7.11 |
| 2012/0179570 A1* | 7/2012 | Blair | G06Q 30/0611 705/26.4 |
| 2013/0060611 A1* | 3/2013 | Fenstermaker | G06Q 10/06393 705/7.39 |
| 2014/0200967 A1* | 7/2014 | Jauri | G06Q 10/06375 705/7.37 |
| 2014/0278644 A1* | 9/2014 | Ferreira | G06Q 10/063114 705/7.15 |
| 2015/0046363 A1* | 2/2015 | McNamara | G06Q 10/0833 705/333 |
| 2017/0083987 A1* | 3/2017 | Colby | G06Q 30/0283 |

* cited by examiner

| | SERVICE COST PROVIDER | | | | | | | WELCOME USER 108 [LOG OUT] |
|---|---|---|---|---|---|---|---|---|
| | ADMINISTRATION | | | | | DEPARTMENT: ALL DEPARTMENTS ▼ | | |
| | SERVICE CODE SEARCH: | 🔍 ⊗ | | | | | | |
| Edit | SERVICE CODE | WEEKLY COST | CURRENT TOTAL COST | PREVIOUS TOTAL COST | TOTAL COST DIFFERENCE (%) | PREVIOUS REVIEW | DEPARTMENT | COST DETAILS | PRICE UPDATE |
| ☐ | SERVICE 1 | $28798.616 | $60,609 | $60,609 | 0 | 16 DAYS | DEPT 1 | MATERIAL COST LABOR COST OTHER | N/A |
| ☐ | SERVICE 2 | $23787.930 | $22,849 | $22,844 | 0.021% | 7 DAYS | DEPT 2 | MATERIAL COST LABOR COST OTHER | N/A |
| ☐ | SERVICE 3 | $6071.283 | $90,931 | $90,931 | 0 | 28 DAYS | DEPT 1 | MATERIAL COST LABOR COST OTHER | N/A |
| ☐ | SERVICE 4 | $14759.810 | $91,676 | $91,676 | N/A | N/A | DEPT 2 | MATERIAL COST LABOR COST OTHER | N/A |
| ☐ | SERVICE 5 | $13208.698 | $14,017 | $3,798 | -0.27% | 7 DAYS | DEPT 2 | MATERIAL COST LABOR COST OTHER | N/A |
| ☐ | SERVICE 6 | $12117.282 | $3,788 | $3,798 | 0 | 7 DAYS | DEPT 2 | MATERIAL COST LABOR COST OTHER | PENDING |
| ☐ | SERVICE 7 | $6687.520 | $80,873 | $80,873 | 0 | 14 DAYS | DEPT 3 | MATERIAL COST LABOR COST OTHER | N/A |
| ☐ | SERVICE 8 | $16367.532 | $5,927 | $5,927 | 0 | 15 DAYS | DEPT 4 | MATERIAL COST LABOR COST OTHER | N/A |
| ☐ | SERVICE 9 | $15653.123 | $28,961 | N/A | N/A | N/A | DEPT 5 | MATERIAL COST LABOR COST OTHER | N/A |
| ☐ | SERVICE 10 | $5376.547 | $11,760 | $10,201 | 15.28% | 14 DAYS | DEPT 2 | MATERIAL COST LABOR COST OTHER | APPROVED |

FIG. 3

| Service Code | Weekly Cost | Current Total Cost | Previous Total Cost | Total Cost Difference (%) | Previous Review | Department | Cost Details | Price Update |
|---|---|---|---|---|---|---|---|---|
| Service 2 | $23787.930 | $22,849 | $22,844 | 0.021% | 7 Days | Dept 2 | Material Cost Labor Cost Other | N/A |
| Service 4 | $144759.810 | $91,676 | $91,676 | 0 | 7 Days | Dept 2 | Material Cost Labor Cost Other | N/A |
| Service 5 | $13208.698 | $14,017 | N/A | N/A | N/A | Dept 2 | Material Cost Labor Cost Other | N/A |
| Service 6 | $12117.202 | $3,788 | $3,798 | -0.27% | 7 Days | Dept 2 | Material Cost Labor Cost Other | Pending |
| Service 10 | $5376.547 | $11,760 | $10,201 | 15.28% | 14 Days | Dept 2 | Material Cost Labor Cost Other | Approved |
| Service 13 | $13117.112 | $7,788 | $7,798 | -0.13% | 7 Days | Dept 2 | Material Cost Labor Cost Other | Pending |
| Service 14 | $3387.520 | $30,873 | $80,873 | 0 | 14 Days | Dept 2 | Material Cost Labor Cost Other | N/A |
| Service 22 | $30125.102 | $235,236 | $235,027 | 0.088% | 21 Days | Dept 2 | Material Cost Labor Cost Other | New |
| Service 25 | $12353.315 | $27,552 | N/A | N/A | N/A | Dept 2 | Material Cost Labor Cost Other | N/A |
| Service 51 | $321.032 | $321,032 | $321,032 | 0 | 31 Days | Dept 2 | Material Cost Labor Cost Other | N/A |

REAL-TIME DETERMINATION OF A SERVICE COST

BACKGROUND

Businesses are continuously seeking ways to more efficiently operate. For instance, businesses which deliver services to a consumer strive to determine a more reliable, efficient, secure, and/or a faster way for determining a real-time cost of each service. In some instances, such services involve complex data from numerous sources which is rapidly changing. As such, there remains a need for a process that integrates the complex data as it changes to allow a business to determine a real-time cost of the services the business provides.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 3 illustrates an example user interface to provide cost information on multiple services.

FIG. 4 illustrates an example user interface to cost information on multiple services from a specific department.

FIG. 5 illustrates an example notification interface of a cost change for a particular service.

FIG. 6 illustrates an example user interface to provide editable details associated with a particular service.

DETAILED DESCRIPTION

Figure 1:
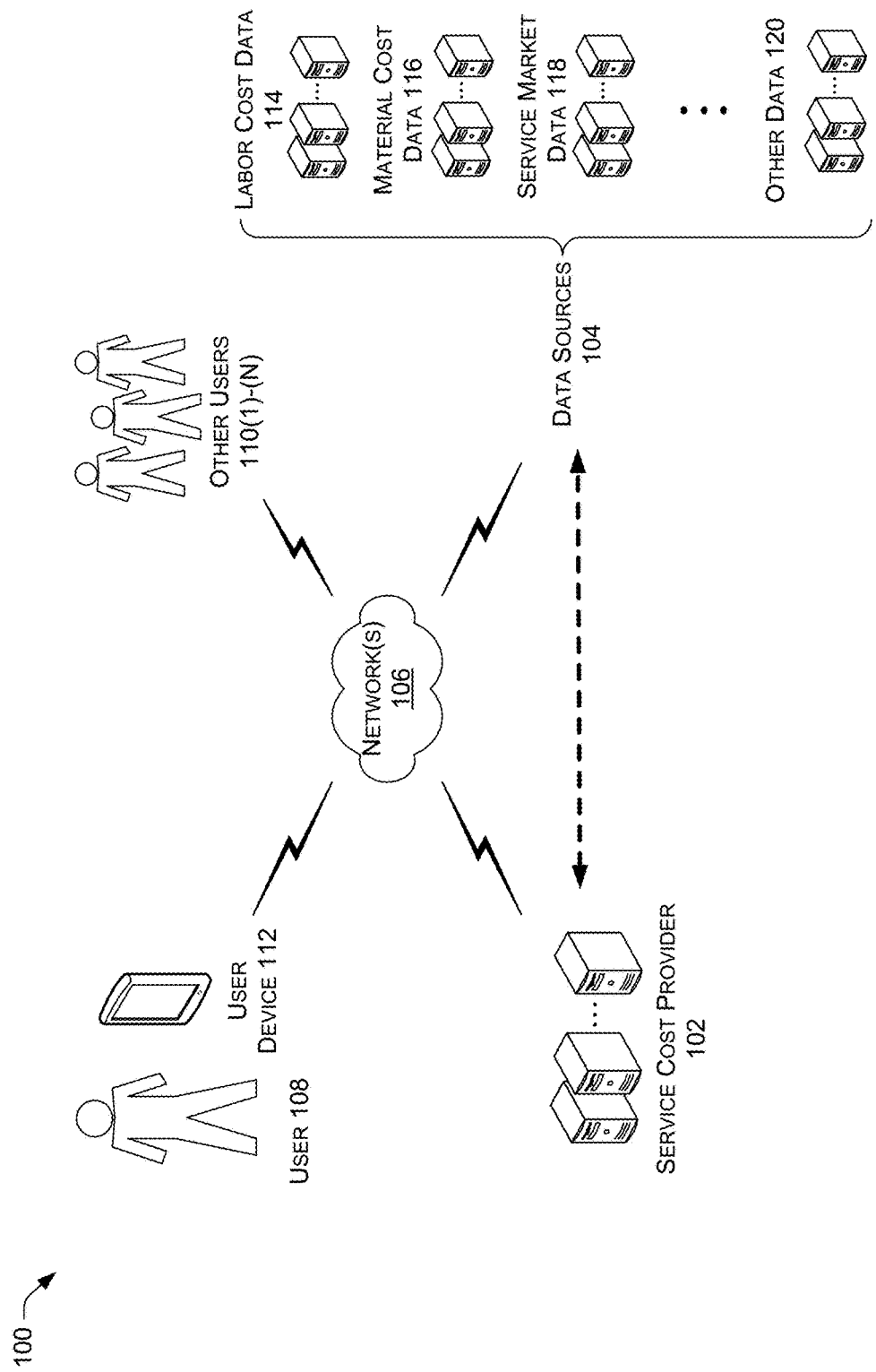
FIG. 1 is a schematic diagram of an illustrative environment for determining a real-time cost of a service.

This disclosure describes, in part, systems and techniques for determining, in real-time, a cost associated with service. In some implementations, the service may be described as performing a medical laboratory test (e.g., a blood test). However, this disclosure covers other services, such as construction, parcel delivery, home repair services, hospitality services, etc.

In some implementations, this disclosure describes a system to access or retrieve complex data from multiple data sources corresponding to a current cost of consumable materials and a current cost of labor used to provide the service. Once retrieved, the system may determine a total current cost of the consumable materials and a total current cost of the labor. Furthermore, the system may use the total current cost of the consumable materials and the total current cost of the labor to determine an overall current cost of the service. The system may simultaneously provide an overall current cost of multiple services.

In some implementations, the overall current cost of the service may be presented in a user interface to a user. In some implementation, the system may determine that the overall current cost of the service differs from a previously determined overall cost. In some implementations, the system may present a notification as part of the user interface to notify the user that the overall current cost of the service exceeds the previously determined overall cost by a predetermined threshold. In addition, the system may receive input from the user to update a price of the service.

To illustrate, envision a user associated with a laboratory that has the capability to perform thousands of testing services on a large quantity of time-sensitive specimens (e.g., blood sample, tissue samples, etc). In order to be able to efficiently determine and/or quickly calculate a total current cost for each testing service, the user may need to have a detailed knowledge of the overall material costs and overall labor costs associated with each of the testing services. However, since these overall material costs, overall labor cost, or other miscellaneous costs associated with testing specimens are constantly changing due to fluctuating costs of chemicals, an amount of wasted material used to calibrate the equipment used to provide the testing service, the staff needed to provide the testing services, among many other cost factors, determining a real-time total current cost for each testing service would be extremely difficult and/or inefficient.

Furthermore, the laboratory may seek to more securely and/or more reliable present the real-time total current cost of the testing services. As such, this disclosure describes various user interfaces to provide information related to the material cost, labor cost, total current cost, and/or previous total cost of each of the testing services provided. In some implementations, as mentioned above, the system may determine a cost difference between a total current cost and a previously determined total cost. For instance, as described above, the system may determine that the total current cost of a testing service is $40 and a previously determined total cost is $35. As such, the system may determine that the difference between the total current cost and the previously determined cost is $5 or a percentage change of 14.28%. In some implementations, the system may determine that the difference is greater than a predetermined threshold. For instance, the difference may be greater than 5%, 10%, 20% or any other difference. In some implementation, the predetermined threshold may be different for each testing service offered. For instance, the predetermined threshold may be higher where the previously determined total cost is higher or vice versa.

In some implementation, the system may present a notification, via a user interface, that the difference between the total current cost and the previously determined cost is greater than the predetermined threshold. Furthermore, the system may allow a user to update a price or fee charged for a particular testing service, via the user interface, based on the total current cost or the difference between the total current cost and the previously determined cost.

The system may also allow a user to monitor an inventory of consumable materials on hand to provide the services via a user interface. In some implementations, the system may allow the user to purchase additional consumable goods and/or select a different supplier of a particular consumable material depending on the data associated with an acquisition cost of the consumable material.

In some implementations, the system may provide communication between equipment used to provide the services (e.g., laboratory testing machines). The system may automatically activate or deactivate a testing machine based on the total current cost and/or a number of tests previously order over a period of time.

The techniques for determining, in real-time, a cost associated with services and generating service cost interfaces as described herein may be implemented in a variety of ways and by a variety of electronic devices.

Illustrative Environment

FIG. 1 is schematic diagram of an illustrative environment 100 for determining, in real-time, a total cost associated with multiple services and generating one or more user interfaces to display information associated with the total cost. As illustrated, environment 100 may include a service cost provider 102 which uses data sources 104 to generate the total current cost. The service cost provider 102 may be hosted by one or more computing devices or servers and may communicate with other computing devices or servers via one or more networks 106. The network(s) 106 may include wireless and/or wired networks, including mobile telephone networks, wide area networks (WANs), and so forth.

The service cost provider 102 may communicate with one or more users, which may include user 108 and the other users 110(1)-(N). User 110 may use a device 112 to communicate with the service cost provider 102 and/or interact with the one or more user interface(s) provided by the service cost provider 102. The device 112 may include virtually any type of electronic device or computing device that can exchange information with another device. For example, the devices 112 may be any one or more of mobile telephones, smart telephones, notebook computers, tablets, desktop computers, vehicle computing devices, kiosks, and/or other types of electronic devices. The service cost provider 102 may provide the user interfaces to the device 112 (or any other device) through a browser, a dedicated application or "app", and/or through messaging services such as short message service (SMS), email, and other messaging services.

In some implementations, the service cost provider 102 may utilize data provided by the user 108 via the one or more user interfaces and/or data provided by the other user 110(1)-(N) via the one or more user interfaces to determine a total current cost of a service. In some instances, the user 108 and the other users 110(1)-(N) may be employees of a particular business using the service cost provider 102. In some implementations, the service cost provider 102 may utilize data from one or more data sources 104. As illustrated, the service cost provider 102 may communicate with the data sources 104 via network(s) 106 to access various types of information to determine the total current cost of a service. For instance, the service cost provider 102 may communicate with a data source associated with labor cost data 114, consumable material cost data 116, service market data 118, and/or other data 120 to obtain information to determine the total current cost of a service. In some implementation, the data obtained from the data sources 104 may be presented in the one or more user interfaces. In some implementations, the one or more data sources 104 may include data provided by a third party external to the service cost provider 102. For instance, the data sources 104 may include data created by a third-party material supplier based on a current acquisition cast of materials associated with the services. However, in some implementations, the data provided by the data sources 104 may be accessible via private data repositories available only to the service cost provider 102. For instance, service cost provider 102 may store, or at least have access to, the data associated with the data sources 104.

The labor cost data 114 may include information that is stored by, or that is supplemental to, the service cost provider 102 about one or more labor costs associated with each of the particular service(s) provided by a business associated with the user 108. In some implementations, the labor cost data 114 may include a number of employees required to complete the service, a wage associated with each employee required to complete the service, a labor cost for the employee(s) performing instrument calibrations associated with the service, a labor cost of the employee(s) performing instrument controls, a labor cost of supervision of the employees performing the service, and/or a labor cost of verification of the service results, among others.

The material cost data 116 may include information that is stored by, or that is supplemental to, the service cost provider 102 about one or more material costs of consumable material used to provide each of the particular service(s) provided by a business associated with the user 108. In some implementations, consumable materials for the laboratory business describe above may include chemicals (acids, analytical reagents, bases, buffers, solvents, detergents, cleansers, dyes, or other solutions), test tubes, culture tubes or media, slides, chemical test strips, pipettes, specimen collection/transportation products, among others. In some implementations, the material cost data 116 may include an acquisition cost associated with each of the consumable materials used in part or in whole to complete the service, a cost associated with waste of one or more consumable materials (i.e. chemicals) used in control testing or calibration of testing instruments or equipment, among other costs.

For instance, in some implementation, the material cost data 116 may include inventory data associated with an amount of a particular consumable material the user has in stock, whether a particular consumable material is backordered or in short supply, and/or a stability of a particular consumable material. For instance, the material data cost 116 may include data indicating that a consumable material in use will expire and/or that a consumable material in storage and not currently in use will expire on a particular day/time.

The service market data 118 may include information that is stored by, or that is supplemental to, the service cost provider 102 about the order history for each of the particular service(s) provided by a business associated with the user 108. In some implementations, service market data 118 may include the number of each service provided by the business over a particular period of time (e.g., one week, one month, one year, or any time frame in between), a total current price of a particular service charged by another, or an average price of a particular service charged by another.

The other data 120 may include information that is stored by, or that is supplemental to, the service cost provider 102 about other cost details or other information associated with each of the particular service(s) provided by a business associated with the user 108. For instance, the other data 124 may include information associated with an instrument or equipment cost used to provide each particular service (e.g., an overall or monthly purchase cost of the instrument(s), a lease or rental cost of the instrument(s)).

As described in detail below, the service cost provider 102 may determine a total current cost of each service provided by the user 108 based on the data from the data sources 104 or the data input by the user 108 or other users 110(1)-(N). In some implementations, the service cost provider 102 may also generate one or more user interfaces to display on one or more devices, such as device 112, for presentation to the user 108. As described below, the one or more user interfaces may include labor cost data, material cost data, service market data, or the other data from the data sources 104, a current total cost of a particular service, a weekly total cost of a particular service, an total cost of a particular service that has been approved by an administrator, previously determined cost of a particular service or set of services, an employee associated with the particular service or set of services, a change in the current cost, a number of days since a determination of a current total cost, among others.

Illustrative Computing Architecture

Figure 2:
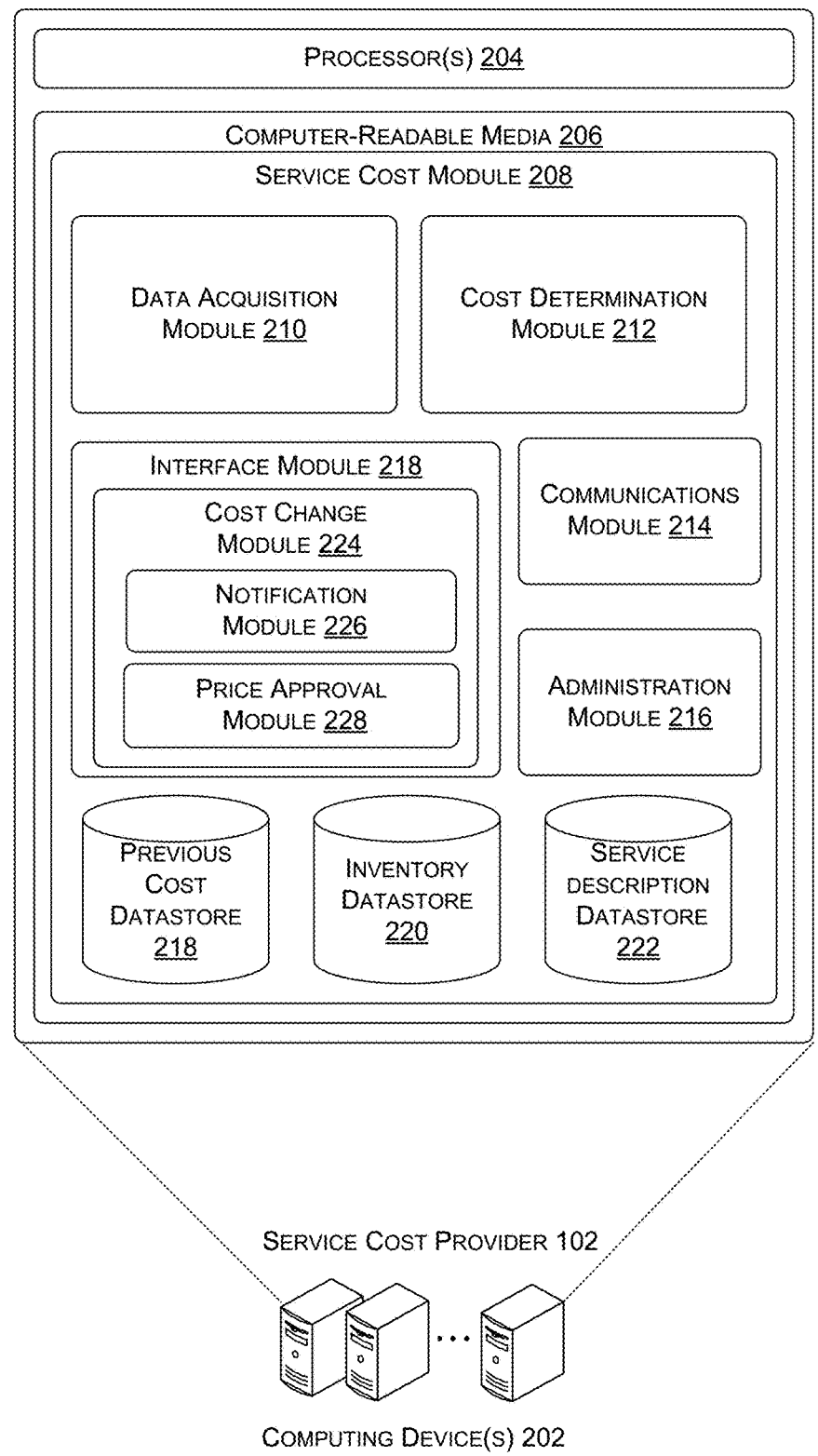
FIG. 2 is a block diagram of an illustrative computing architecture to determine a real time cost of a service and to provide user interface to display information associated with the cost.

FIG. 2 shows a block diagram of an illustrative computing architecture 200 for the service cost provider 102 to determine a current total cost of a service and/or provide one or more tracking interfaces. The computing architecture 200 may include one or more computing devices 202 that may be implemented in a distributed or non-distributed computing environment.

The computing devices 202 may include one or more processors 204 and one or more computer-readable media 206 that stores various modules, applications, programs, or other data. The computer-readable media 206 may include instructions that, when executed by the one or more processors 204, cause the processors to perform the operations described herein for the service cost provider 102.

Implementations may be provided as a computer program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of media/machine-readable media suitable for storing electronic instructions. Further, embodiments may also be provided as a computer program product including a transitory machine-readable signal (in compressed or uncompressed form). Examples of machine-readable signals, whether modulated using a carrier or not, include, but are not limited to, signals that a computer system or machine hosting or running a computer program can be configured to access, including signals downloaded through the Internet or other networks. For example, distribution of software may be by an Internet download.

In some implementations, the computer-readable media 206 may store a service cost module 208. The service cost module 208 may include various modules, such as a data acquisition module 210, a cost determination module 212, a communications module 214, and an interface module 216, each of which are described in detail below. The modules may be stored together or in a distributed arrangement. In some implementations, the modules may represent services that may be performed using components that are provided in a distributed arrangement, such as by virtual machines running in a cloud computing environment. In some implementations, one or more datastores may be included in the computing architecture 200, accessible by the computing device 202 and the service cost module 208. The one or more datastores may include a previous service cost datastore 218, an inventory datastore 220, and a service description datastore 222

As mentioned above, the service cost module 208 may include a data acquisition module 210. In some implementations, the data acquisition module 210 may access and/or acquire data from the one or more data sources 104. For instance, the data acquisition module 210 may acquire data associated with labor cost data 114 and material cost data 116 in order to accurately determine the total current cost of a particular service at any point in time.

The service cost module 208 may include a cost determination module 212. The cost determination module 212 may process the data acquired by the data acquisition module 210 to calculate a total current cost of one or more services provided by a business of the user. As described above, the cost determination module 212 may determine a total current cost of a service by determining a total current cost of labor needed to currently provide a service, a total current cost of consumable materials needed to currently provide the service, and other cost data which may affect the current cost of the service.

In some implementations, the cost determination module 212 may determine the total current cost of labor based at least in part on an amount of time to complete a number of the services over a predetermined time, divided by the number of the services completed over the predetermined time.

In some implementations, the cost determination module 212 may determine the total current cost of a service by calculating the total cost of materials (e.g., material used in calibration, control, and performing the service) and calculating the total cost of labor (labor in performing the calibration, control, and performing the service) over a predetermined period of time (e.g., one day, one week, two weeks, one month, etc). The total cost of the materials and the total cost of labor for the particular service over the period of time is added together and then may be divided by the total number services performed during the predetermined period of time.

The service cost module 208 may include a communications module 214. In some implementations, the communications module 214 may allow user 108 of the service cost module 208 to communicate with the one or more data sources 104 and/or the other users 110(1)-(N) of the service cost provider 102. In some implementations, the communication from the communications module 214 may be communications to a supplier of a consumable material associated with a particular service. In some implementations, the communication from the communications module 214 may be communications to an instrument or equipment used to provide the service. For instance, the communications may be to and/or from a particular laboratory analyzer in use to produce blood testing services.

The service cost module 208 may include an administration module 216. In some implementations, the administration module 216 may allow a privileged user, such as an administrator, to set parameters and guidelines for the service cost provider 102. For instance, the administration module 216 may allow for initial data entry associated with the labor cost of each employee. Furthermore, the administration module 216 may allow a user to specify a period (e.g., one day, two days, one week, one month, etc.) for the data acquisition module 210 to access the one or more datastores 104 and/or a period for the cost determination module 212 to determine the current total cost of a particular service. For instance, an administrator, via a user interface associated with the administration module 216, may determine that a current total cost of a service with more volatile material costs and/or labor costs may be better served by a daily or weekly determination of the current total cost.

The administration module 216 may account for multiple levels of permission within the servicer cost provider 102. For instance, each user of the service cost provider 102 may be assigned a permission or security level as either an administrator, approver, manager, or a user. In some implementations, an administrator may have permission to add services to the service cost provider 102, update or edit existing services, delete services, and/or approve price updates for services. While an approver may be similar to an administrator, the approver may not have permission to delete service for the service cost provider 102. A manager and a user may differ in that the user may not be have permission add or edit service in the service cost provider 102. However, neither the manager or the user may approve a price update for services. In this implementation, the manager and the user must submit a price update for approval by an administrator or an approver as described below with regard to FIG. 5.

In some implementations, the service cost module 208 may utilize the data acquired by the data acquisition module 210 and total current cost determined by the cost determination module 212 to create one or more user interface(s). In some implementations, the service cost module 208 may include the interface module 218 which may organize and present the data acquired by the data acquisition module 210 and determined by the cost determination module 212 to a user, such as user 108. In some implementations, the interface module 218 may include a cost change module 224.

In some implementations, the interface module 218 may allow for simultaneous presentation of service cost information to one or more users on one or more devices. As described in detail below, the interface module 218 may allow a user to view, select, alter, and/or configure information associated with services provided by a business or user. In some implementations, interface module 218 may be provided in the computer readable media 206 and may be executed on the processing unit(s) 204 to provide a user interface to assist the user 108 in operation of service cost provider 102. The interface module 218 may allow tactile entry of requests (e.g., via touchscreen or touchpad, etc.), textual entry of requests (e.g., via a cursor, controller, keyboard, etc.), audible entry of requests (e.g., via a microphone), or entry of requests in any other manner.

The cost change module 224 may generate and organize information associated with a change in the total current cost of a service. For instance, the cost determination module 212 may determine the current total cost of a particular service at a particular time or over a particular time frame. The cost change module 224 may access the previous cost datastore 218 for information associated with previous total cost of the particular service. In some implementations, the cost change module 224 may determine a difference between the current total cost and the previous total cost of the particular service. In some instances, the cost change module 224 may determine that the difference is greater than a threshold or cost variance limit (e.g., monetary or percentage). In some implementations, the service cost provider 102 may be set with a default cost variance limit (e.g., 1%, 3%, 5%, etc) for all services. However, as described below, the cost variance limit may be edited by a user of the service cost provider 102. Furthermore, the cost change module 224 may organize the cost difference information for presentation by the interface module 218 in one or more user interfaces.

In some implementations, notification module 226 may generate a notification user interface for presentation on a device associated with a user when the cost change module 224 determines that the cost difference between the current total cost and a previous total cost is greater than a threshold (e.g., the current total price is substantially higher or lower than a previous total cost of a service). As mentioned above, the threshold amount may vary between the multiple services offered by the business associated with the user. Furthermore, in some implementations, the cost change module 224 may rank the cost differences of multiple services based on an amount the current total cost of each service and a previous total cost differ. In some implementations, the notification module 226 may present the ranked cost differences.

In some implementations, in response to the notification user interface generated by the notification module 226, a user, such as an administrator with price adjustment privileges, may elect to alter the current amount charged or the actual price of a service based on the current total cost of the service or determined difference between the current total cost and a previous total cost. In some instance, the price approval module 228 may receive a request to alter or update the current amount charged for a particular service. The price approval module 228 may determine whether the user requesting the update has the proper authority to make such or change by accessing the administration module 216. If the price approval module 228 determines that the user is authorized to make the price update, a first notification may be generated by the price approval module 228 indicating that the price update was successful. On the other hand, if the price approval module 228 determines that the user is not authorized to make the price update, a second notification may be generated by the price approval module 228 indicating that the price update is pending review or formal approval by an administrator.

As mentioned above, the service cost module 206 may include a previous cost datastore 218, an inventory datastore 220, and a service description datastore 222. The previous cost datastore 218 may store all total cost determinations made by the cost determination module 212 and provide a stored previous totals costs to the cost change module 224 as described above.

The inventory datastore 220 may include data associated with consumable material inventory. For instance, a number of materials in stock, a stock keeping unit (SKU) or other identifier of each material, a location of the material, an expiration of the material, one or more suppliers or vendors of the material, a material safety data sheet (MSDS) associated with the material, and a purchase history of the material.

The service description datastore 222 may include data associated with specific detail of each service. For instance, the number of each services order or performed over a period of time, a department of the business which performs the services, equipment used to perform the service, consumable materials needed to complete the service, a current procedural terminology (CPT) code associated with the service, and methodologies to perform the service.

Illustrative Tracking Interfaces

FIGS. 3-6 illustrate various example user interfaces generated by the interface module 218 of the service cost module 208 for presentation on an electronic device, such as device 112 of the user 108. More specifically, the example user interfaces may be generated to display information associated with a real-time cost of a service provided by a business as described above. In some implementations, the example user interfaces may help users view how the service costs are determined, how often the costs associated with the services are updated, and/or from what sources material cost data and/or labor cost data is retrieved to determine the costs of a particular service.

FIG. 3 illustrates an example user interface 300 generated by the interface module 218 for presentation on an electronic device. The example interface 300 may include a location 302 of an identification of a user currently logged into the tracking service 102. For instance, FIG. 3 shows at location 302 that user 110 is logged onto the service cost provider 102.

Interface 300 illustrates that user 108 may select the services box 304. In some implementations, upon selection of the service box 304, the interface module 218 may provide an indication of the selection by, for example, highlighting box 304.

In some implementations, one or more columns and row of service information may appear within interface 300 after receiving the selection of the service box 304. As shown in FIG. 3, each row of information may be highlighted in a manner that is different from the bordering rows. In some implementations, the information in the one or more columns and rows may be acquired by the data acquisition module 210 and/or determined by the cost determination module 212. The information displayed on the interface 300 may include a service code to identify the services presented on the interface 300, an average weekly cost of each displayed service, a current total cost of each displayed service, a most previously determined total cost of each displayed service (if applicable), a difference between the current total cost and the previously determined total cost, a date of a most recent cost review, a business department in which the service is performed, cost details associated with the services, and/or an indication the status of a price update.

In some implementations, the interface 300 may be sorted by any of the information presented in the one or more columns (i.e., total cost difference, price update, etc). Furthermore, as described below with reference to FIG. 4, the interface 300 may be filtered at department input box 306 to display cost information for services associated with a particular department. As shown in FIG. 3, department input box 306 indicated services for "All Departments" are currently displayed on interface 300.

As shown in FIG. 3, row 308 of interface 300 illustrates various information associated with "Service 2." For instance, the "weekly cost" of service 2 is "$23,787.93;" a "current total cost" is "$22.849;" a previous total cost" is "$22.844;" a "total cost difference" is "0.021%;" a "previous review" was completed "7 days" ago; a "Department" is "Dept 1;" the cost details as hyperlinks to separate interfaces with information related to "Material Cost," "Labor Cost," or "other" cost details; and a status of a "price update."

In some implementations, the "weekly cost" may be a combination of the total material cost and the total labor cost of a particular service for one week. In some implementations, the "weekly cost" may be from the week immediate preceding the current week. In other implementations, the "weekly cost" may be an average weekly cost from a predetermined number of preceding weeks. In yet another implementation, the "weekly cost" may be a rolling weekly cost that may be updated on a daily basis to account for the seven days immediately preceding the current day. The "weekly cost" may be determined by the cost determination module 212 by adding the "current total cost" based on any of the time periods described above.

In some implementations, the "current total cost" may be determined by the cost determination module 212 based at least on a summation of a total labor cost and a total material cost as described above. Furthermore, as described above, each labor cost of the total labor cost and each material cost of the total material cost may be retrieved by the data acquisition module 210 and provided to the cost determination module 212. As described above, the "current total cost" may be a real-time cost to perform a single service based on the current labor cost, current material cost, or other current cost factors.

The "previous total cost" may be acquired from the previous cost database 218 of the service cost module 208. The "previous total cost" may be a stored cost, such as a previous "current total cost," associated with a previous cost to perform a single service based on the previous labor cost, previous material cost, or other previous cost factors.

As shown in FIG. 3, interface 300 shows that a "total cost difference" between the "previous total cost" and the "current total cost" has increase by "0.021%." In some implementations, the "total cost difference" may be displayed in terms of financial difference in dollars and cents.

Interface 300 may also include the "cost details" for each service code. In some implementation, the interface 300 may present hyperlinks to each cost details associated with the service codes. For instance, upon selection of a hyperlink for "material cost," "labor cost," or "other" cost may present a separate user interface or a pop-up interface displaying the specific details associated with the selected cost. In other implementations, the interface 300 may include separate columns displaying a breakdown of each of the "material cost," "labor cost," or "other" cost for each displayed service.

As described above, each of the "material cost," "labor cost," or "other" cost may be determined by the cost determination module 212 from data acquired by the data acquisition module 210 from the data sources 104. As one example, the "material cost" of "service 2" may include a cost of pipettes, culture media, test tubes, and/or chemicals used to perform the service. In some implementations, the "material cost" may account for chemicals wasted to calibrate equipment, run control services, and/or perform dilutions associated with the service. While the "labor cost" of "service 2" may include a specific breakdown of costs associated with the employee or employees performing the service. In some implementations, the "labor cost" may include a cost to account for a number of repeat services during a period of time where the service, such as a testing service, results in an inconclusive or incomplete result.

Finally, the "other" cost of the "cost details" may include cost to account for downtime associated with instrument used to perform a particular service, a portion of a lease cost, purchase cost, or rental cost of one of more instrument used to perform the particular service.

As shown in FIG. 3, row 310 of interface 300 illustrates various information associated with "Service 5." For instance, the "weekly cost" of service 5 is "$13,208.698;" a "current total cost" is "$14.017." Service 5 indicates that a previous total cost," a "total cost difference," and a "previous review" as "N/A." In some implementations, this may indicate that these items are not valid for service 5 since service 5 may be a new service offered by the business.

As shown in FIG. 3, row 312 and row 314 of interface 300 illustrate that the "total cost difference" is "–0.27%" and "15.28%" for "service 6" and "service 10," respectively. Furthermore, as described above, the "total cost difference" for each of "service 6" and "service 10" may exceed a specific cost difference threshold as determined by the cost change module 224. Consequently, the interface module 218 may present a notification to the user to approve a new price for the service based at least on the "total cost difference" and the "current total cost" of the service. Furthermore, as shown in row 308, the "price update" is illustrated as "N/A" since the "total cost difference" may not exceed a predetermined threshold or a cost variation limit for service 2.

FIG. 4 illustrates an interface 400 for displaying cost information for multiple services. In some implementations, interface 400 may display similar information as described above with regard to interface 300. However, in other implementations, interface 400 may include additional information associated with cost of services offered by a business.

In some implementations, when a user, such as user 108, manipulates a cursor, highlights, or touches an area containing the department input box 402, the interface module 218 may generate details for display regarding a specifically selected department. For instance, when user 108 selects or inputs "Dept 2" in the department input box 402, the interface module 218 may filter data received from the data acquisition module 210 to limit the display to services performed by department 2 of the business.

As shown in FIG. 4, each displayed service code on interface 400 is labeled "Dept 2." Service 2, Service 4, Service 5, Service 6, and Service 10 which were displayed on interface 300 of FIG. 3 are also presented on interface 400. In addition, Service 13, Service 14, Service 22, Service 25, and Service 51 and their respective cost information is displayed on interface 400.

FIG. 4 also illustrates a total cost difference for Service 22 as an increase of "0.088%." In addition, interface 400 shown the price update 404 as "New" as opposed to "N/A," "Pending," or "Approved." In some implementations, the price update "New" is an indication that the total cost difference between the current total cost and the previous total cost exceeds the cost variation limit or threshold (as determined by the cost change module 224) yet a price update or change has not been submitted for approval or approved by an administrator (by the price approval module 228). In some implementations, the indication that the price update is "new" may cause the notification module 266 to generate a cost change notification as described with regard to FIG. 5.

Figure 5:
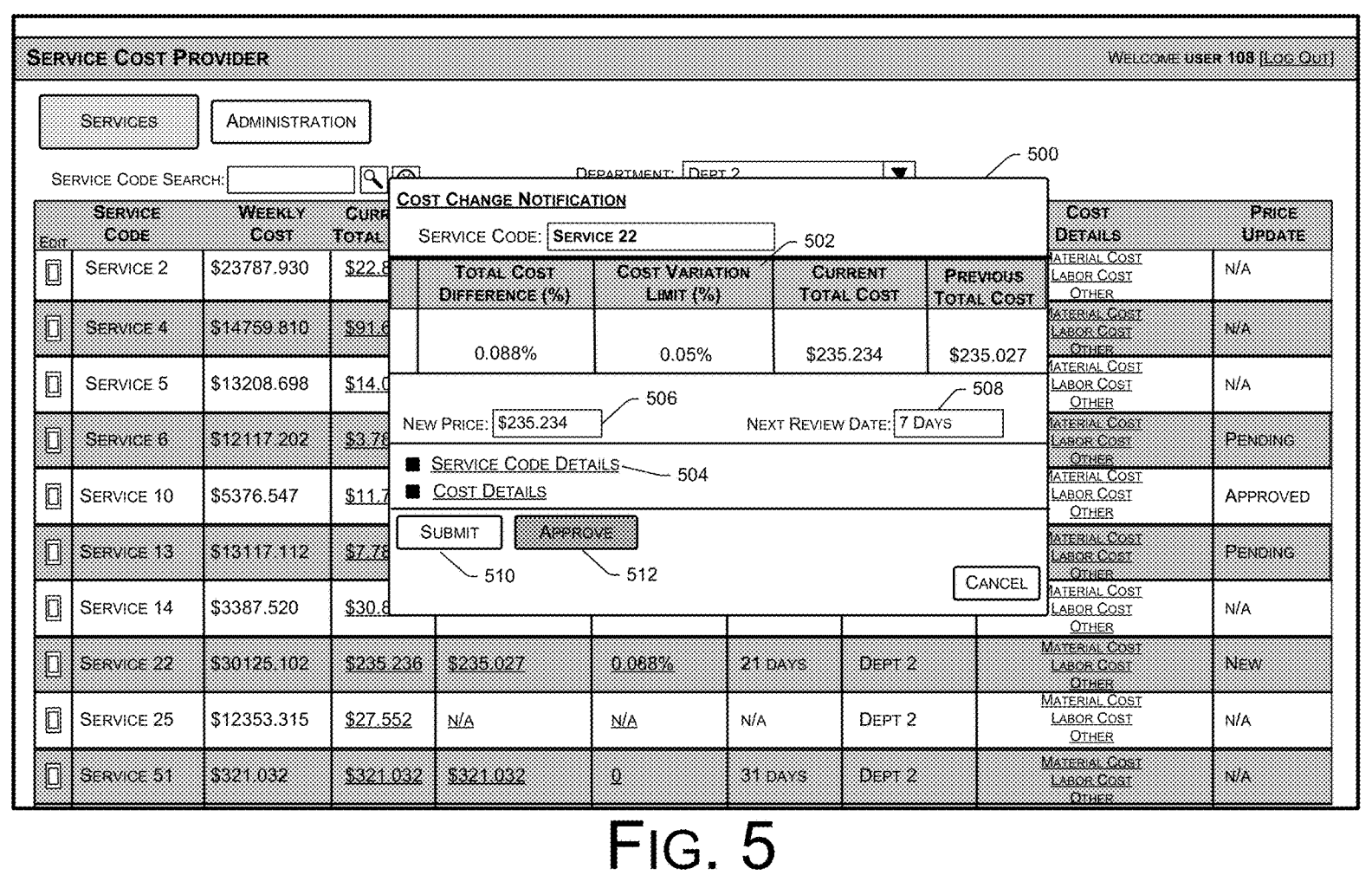

FIG. 5 illustrates an example cost change notification 500 which may be generated and presented by the notification module 226 of the cost change module 224. As mentioned above, the notification module 226 may create and/or present the notification 500 to a user that a total cost difference for particular service exceeds a predetermined cost variation limit. In some implementations, the notification module 226 may include cost details in the generated notification corresponding to the current total cost of a particular service and a previous total cost of the particular service. In some instances, the notification module 226 may generate a notification interface to be sent via email, short message service (SMS) or multimedia message service (MMS) to the user device 112 of the user 108 that a particular service has a total cost difference over the cost variation limit.

As illustrated in FIG. 5, the example notification 500 may include details regarding the cost of service 22 as previously shown in FIG. 4. For instance, FIG. 5 shows the example notification 500 including the total cost difference, the current total cost, the previous total cost, and a link to the cost details (e.g., material cost, labor cost, and/or other costs). In addition, the notification 500 may display the cost variation limit 502 for service 22. As described below, the cost variation limit 502 may be a threshold amount the total cost difference must exceed in order to notification module 226 to generate the notification 500. Furthermore, the cost variation limit 502 may be set by a user or administrator and be unique for each service offer. The cost variation limit 502 is shown as a percentage; however, in some implementations, the cost variation limit may be a monetary amount.

In some implementations, the notification 500 may include a link 504 to display service code details. As described below with regard to FIG. 6, the service code details include any editable information associated with the particular service code. For instance, the service code detail would include the cost variation limit 502. In some implementations, a user such as an administrator with certain privileges, may access an interface associated with the service code details to edit, add, delete, update or otherwise change information associated with the particular service code.

In some implementations, the notification 500 may include a new price box 506. In some implementations, the user may input a new or updated price to be charged by the business for service 22 based on the current total price. For instance, the user may input the current total price of $235.234 in the new price box 506. In other implementations, the user may input any new price for service 22 in new price box 506.

Notification 500 also includes a next review date box 508. Initially, the next review box 508 displays the preset timeframe (i.e., 7 Days) until the next cost review of service 22. However, next review box 508 may allow a user to input a different timeframe for a cost review of service 22. For instance, if a cost associated with service 22 is volatile because materials to complete service 22 are in short supply, the user may wish to set the next cost review to a shorter timeframe (e.g., from 7 Days to 2 Days).

FIG. 5 also illustrates that the notification 500 may include an area for the user to either submit the new price and/or next review date for approval or, if the user has administrative privileges determined by the business, to approve the new price and/or next review date. In some implementations, the price approval module 228 may receive an indication that either the submit box 510 or approve box 512 has been selected on the notification 500 and instruct interface module 218 to update future user interfaces to show the "price update" of service 22 as either "pending" or "approved." In some implementations, the approval box 512 may not be present on notification 500 or shown as not selectable (e.g., greyed-out) on notification 500 when a user logged into service cost provider 102 is identified as not having administrative privileges.

In some implementations, the price approval module 228 recognizes the user selected to approve the new price for a particular service. In response, the price approval module 228 may provide an indication of the new price to the communication module 214 or other module. The communication module 214 may provide the approved new price for the particular service to another portion of the service cost provider 102 such that the user of the service cost provider 102 may immediately begin charging the new price for the particular service.

Figure 6:
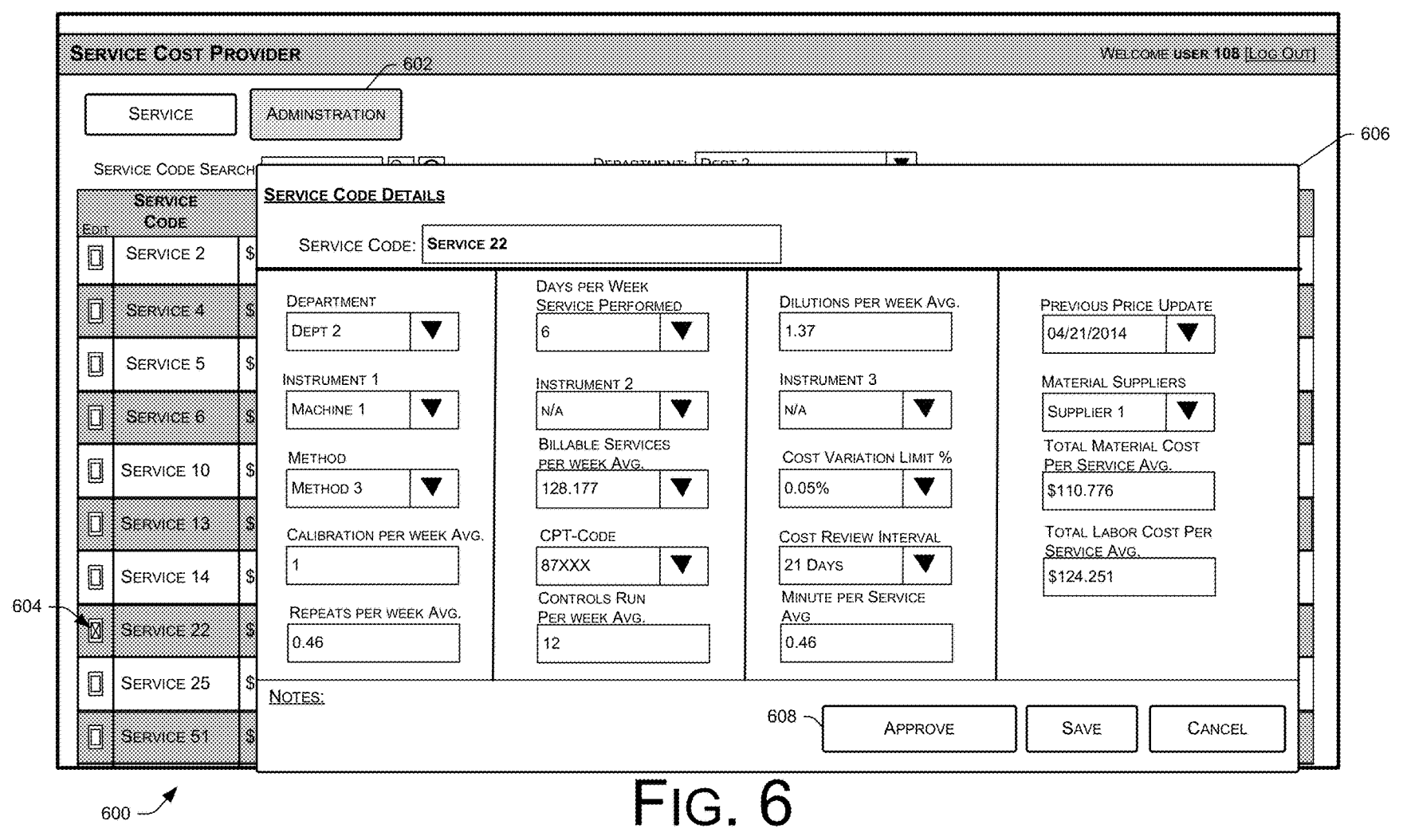

FIG. 6 illustrates another example user interface 600 generated by the interface module 208 of the service cost provider 102. Interface 600 may be provided when the user selects the administration box 602. In some implementations, upon selection of the administration box 602, the interface module 218 may provide an indication of the selection by, for example, highlighting box 602. In some implementations, administration box 602 may only be presented as a selection option on interface 600 when the user logged into the system is determined to have administrative privileges.

Interface 600 further illustrates that, under the administration function and upon selection of the edit tab 604 associated with service 22, a service code detail box 606 may be presented on the interface 600. In other implementations, the service code detail box 606 may be presented as a separate user interface.

As mentioned above, the service code details box 606 may include any editable information associated with the particular service code, in this case service 22. For instance, where the service cost provider is configured for a testing business as described above, the service code details may include a department within the business tasked to perform the service (e.g., chemistry, immunology, hematology, cytogenetics, molecular, virology, coagulation, toxicology, etc), an instrument or instruments used to perform the service, a testing method to perform the service, a number of calibrations per timeframe (e.g., weekly, daily, etc), a number of repeat services per timeframe (e.g., weekly, daily, etc), a number of days per week the service is to be performed, a number of services bill per timeframe, a medical billing code associated with the service, a number of control test run per timeframe, a number of dilutions per timeframe, the cost variation limit, a cost review interval, an average number of minutes per service, a date of the most previous price update, a list of suppliers who supply the materials to perform the service, an average total material cost per service, and an average total labor cost per service.

In some implementations, the service code details box 606 may also include a location for a user to add notes. The note may be saved for other user when the service code detail box 606 is provided.

In some implementations, the items shown within the service code details box 606 may be changed by the user. In some implementations, the user may select an item shown in the service code details box 606 to access further information regarding the selected item.

In some implementations, the editable information within the service cost details box 606 may alter how the service cost provider 102 determines the current total cost of a particular service. For instance, a user may activate or deactivate one or more machines configured to perform the service. For instance, the user may activate a second machine to begin performing a particular service where a demand for the service has suddenly increased. In some implementations, the user may alter an order of service priority for instrument configured to perform a particular service. For instance, a user may switch from a first machine to a second machine where the first machine is experiencing downtime or a separate shift in service priority.

As mentioned above with regard to FIG. 5, the user may also alter the cost variation limit needed to trigger a cost change notification in the service code details box 606. In some implementations, the service code details box 606 may allow the user to access details associated with material suppliers. For instance, the user may determine for each material needed to perform the service who are the currently available supplier and what price the currently available suppliers are charging for the particular material. Furthermore, in some implementations, the service cost provider 102 may allow the user to select a preferential material supplier for each material. The preference may be based on cost, delivery time, quality, bulk delivery, among others.

Illustrative Operations

Figure 7:
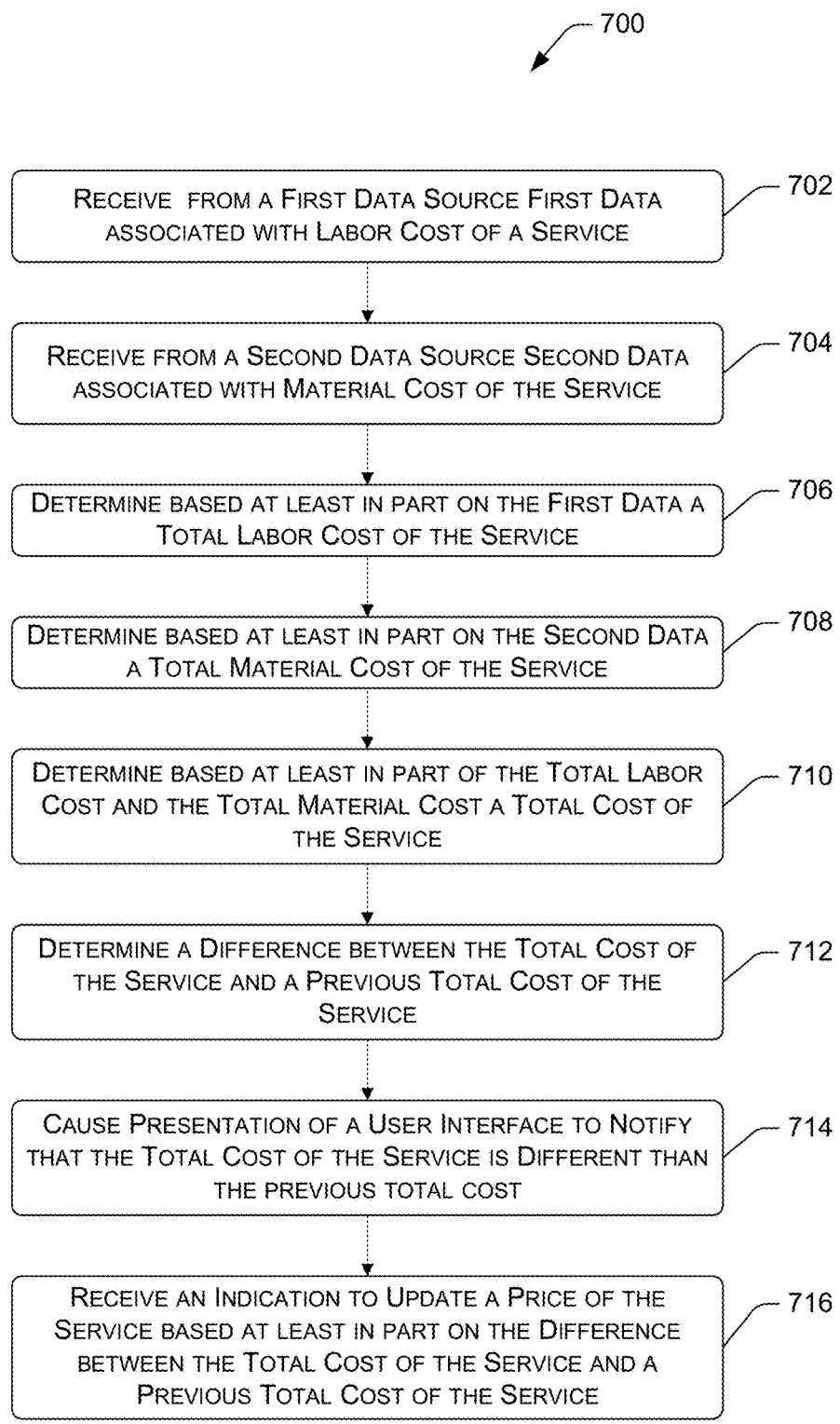
FIG. 7 illustrates an example process for determining a total cost of a service and updating a price of the service.

FIG. 7 is a flow diagram of illustrative process for implementing the techniques described above of determining a current total cost of a service. The processes are illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. Furthermore, the processes are described with reference to the environment 100 and may be performed by the computing architecture 200. Of course, the processes may be performed in other similar and/or different environments.

At 702, first data associated with individual labor costs of a service may be received from a first data source. For instance, the data acquisition module 210 may access or receive labor cost data 114 from the data sources 104.

At 704, second data associated with individual material costs of the service may be received from a second data source. For instance, the data acquisition module 210 may access or receive material cost data 1116 from the data sources 104.

At 706, a total labor cost of the service may be determined based at least in part on the first data. For instance, the cost determination module 212 may determine the total labor cost to account for all the labor costs associated with the service based on the labor cost data 114 received by the data acquisition module 210.

At 708, a total material cost of the service may be determined based at least in part on the second data. For instance, the cost determination module 212 may determine the total material cost to account for all the consumable material costs associated with the service based on the labor cost data 116 received by the data acquisition module 210.

At 710, a total cost of the service may be determined based at least in part on the total labor coast and the total material cost. For instance, the cost determination module 212 may add the total labor cost and the total material cost to determine the total cost of the service.

At 712, a difference between the total cost of the service and a pervious total cost of the service may be determined. For instance, the cost change module 224 may access the previous cost datastore 218 to retrieve a most recent previous cast of the service. The cost change module 224 may compare the total cost determined by the cost determination module 212 and the previous cost from the previous cost datastore 218 to determine a cost difference.

At 714, a user interface may be presented to notify that the total of the service is different from the previous total cost. For instance, the notification module 226 may generate a notification interface to display the cost difference determined by the cost change module 224.

At 716, an indication to update a price of the service based at least on the difference between the total cost of the service and the previous total cost of the service. For instance, the price approval module 228 may receive an indication on the notification interface provided by the notification module 226 to set a new price for the service based at least on the cost difference determined by the cost change module 224 or the determined total cost of the service.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed is:

1. A system for determining a current total cost of a medical laboratory service, the system comprising:
   one or more processors;
   one or more computer-readable media storing computer-executable instructions that, when executed by the one or more processors, cause the one or more processors to perform acts comprising:
   enhancing efficiency of determining the current total cost of the medical laboratory service by:
      receiving a request to determine the current total cost of the medical laboratory service;
      accessing first data based at least in part on the request, the first data associated with a current material cost of at least one consumable material associated with the medical laboratory service;
      accessing second data based at least in part on the request, the second data associated with a current labor cost of associated with the medical laboratory service;
      determining, in real-time, the current total cost of the medical laboratory service based at least in part on the first data and the second data;
      determining a cost difference between the current total cost of the medical laboratory service and a previous total cost of the medical laboratory service;
      determining that the cost difference exceeds a predetermined threshold;
      causing presentation of a user interface to notify that the cost difference exceeds the predetermined threshold; and
      automatically activating or deactivating one or more instruments associated with the medical laboratory service based at least in part on the current total cost, including:
         communicating with the one or more instruments associated with the medical laboratory service to:
            cause at least one of the one or more instruments to become active based at least in part on the current total cost exceeding the predetermined threshold; or
            cause at least one of the one or more instruments to become inactive based at least in part on the current total cost exceeding the predetermined threshold;
      wherein the current labor cost is determined based at least in part on an amount of time to complete a number of the medical laboratory services over a predetermined time, divided by a number of the medical laboratory services completed over the predetermined time.

2. The system as recited in claim 1, wherein the current material cost comprises at least one of a current acquisition cost of supplies used to perform the medical laboratory service or a cost of an amount of supplies used to calibrate the one or more instruments used to perform the medical laboratory service.

3. The system as recited in claim 1, the act acts further comprising:
   receiving, via the user interface, a request to modify the current total cost of the medical laboratory service based at least in part on the cost difference exceeding the predetermined threshold;
   submitting the request to modify the current total cost for approval;
   receiving an indication of approval of the request to modify the current total cost; and
   updating the current total cost of the medical laboratory service based at least in part on the cost difference exceeding the predetermined threshold.

4. The system as recited in claim 1, wherein the user interface includes at least one of:
   a description of the medical laboratory service;
   an approved total cost of the medical laboratory service;
   a percentage increase of the current total cost of the medical laboratory service over a previous total cost of the medical laboratory service;
   a percentage decrease of the current total cost of the medical laboratory service over a previous total cost of the medical laboratory service;
   a cost of the medical laboratory service over a predetermined period of time;
   an amount of time since the previous total cost of the medical laboratory service was determined; or
   a current inventory level of at least one consumable material associated with the medical laboratory service.

5. The system as recited in claim 1, the acts further comprising:
   determining third data, the third data associated with a number of medical laboratory services previously performed over a predetermined period of time;
   and wherein determining the current total cost of the medical laboratory service is based at least in part on the first data, the second data, and the third data.

6. One or more non-transitory computer-readable media storing computer-executable instructions that, when executed, cause one or more processors to perform acts comprising:
   collecting data from one or more data sources, the data associated with at least one of (i) a material cost associated with a first medical laboratory service and a material cost associated with a second medical laboratory service over a predetermined period of time, (ii) a labor cost associated with the first medical laboratory service and a labor cost associated with the second medical laboratory service over the predetermined period of time, or (iii) a number of the first medical laboratory services and a number of the second medical laboratory services completed over the predetermined period of time;
   enhancing efficiency of determining total cost of medical laboratory service by:
      receiving a request to determine a total cost for each of the first medical laboratory service and the second medical laboratory service over the predetermined period of time;
      determining, in real-time, for each of the first medical laboratory service and the second medical laboratory service, the total cost of the respective medical laboratory service over the predetermined period of time based at least in part on the data;
      determining a first change in the total cost of the first medical laboratory service over the predetermined period of time compared to a previous first total cost of the first medical laboratory service over a previous predetermined period of time;
      determining a second change in the total cost of the second medical laboratory service over the predetermined period of time compared to a previous second total cost of the second medical laboratory service over the previous predetermined period of time;

causing display of the total cost of the first medical laboratory service and the second medical laboratory service on a user interface;

causing display of the first change and the second change on the user interface;

automatically activating or deactivating one or more first instruments associated with the first medical laboratory service based at least in part on the total cost of the first medical laboratory service by communicating with the one or more first instruments; and automatically activating or deactivating one or more second instruments associated with the second medical laboratory service based at least in part on the total cost of the second medical laboratory service by communicating with the one or more second instruments;

wherein the labor cost associated with the first medical laboratory service is determined based at least in part on an amount of time to complete the number of the first medical laboratory services over the predetermined period of time, divided by the number of the first medical laboratory services completed over the predetermined period of time; and wherein the labor cost associated with the second medical laboratory service is determined based at least in part on an amount of time to complete the number of the second medical laboratory services over the predetermined period of time, divided by the number of the second medical laboratory services completed over the predetermined period of time.

7. One or more non-transitory computer readable media as recited in claim 6, the acts further comprising:
determining that the first change exceeds a predetermined threshold;
causing presentation of an alert notification on the user interface based at least in part on the first change exceeding the predetermined threshold; and
receiving a request to modify a current cost of the first medical laboratory service based at least in part on the first change exceeding the predetermined threshold.

8. One or more non-transitory computer readable media as recited in claim 6, the acts further comprising:
determining that the second change exceeds a predetermined threshold;
causing presentation of an alert notification on the user interface based at least in part on the second change exceeding the predetermined threshold; and
receiving a request to modify a current cost of the second medical laboratory service based at least in part on the second change exceeding the predetermined threshold.

9. One or more non-transitory computer readable media as recited in claim 6, the acts further comprising:
determining that at least one of the first change or the second change exceeds a predetermined threshold;
causing presentation of an alert notification on the user interface based at least in part on whether the first change or the second change exceeds the predetermined threshold; and
receiving a request to modify a current cost of the first medical laboratory service or the second medical laboratory service based at least in part on whether the first change or the second change exceeds the predetermined threshold.

10. One or more non-transitory computer readable media as recited in claim 6, wherein the data is further associated with instrument costs associated with one or more first and second instruments used to complete the first medical laboratory service and the second medical laboratory service over the predetermined period of time.

11. One or more non-transitory computer readable media as recited in claim 6, wherein the predetermined period of time is seven days.

12. One or more non-transitory computer readable media as recited in claim 6, wherein the data is associated with the material cost associated with the first medical laboratory service and the second medical laboratory service, and the data accounts for material waste in completing the first medical laboratory service and the second medical laboratory service.

13. A computer-implemented method of adjusting a total cost of a medical laboratory service, the method comprising:
under control of one or more computer systems configured with executable instructions, enhancing efficiency of determining the total cost of the medical laboratory service by:
receiving a request to determine the total cost of the medical laboratory service;
receiving first data from a first data source, the first data indicating labor costs of the medical laboratory service;
receiving second data from a second data source, the second data indicating material costs of the medical laboratory service;
determining a total labor cost of the medical laboratory service based at least on the first data;
determining a total material cost of the medical laboratory service based at least on the second data;
determining, in real-time, the total cost of the medical laboratory service based at least in part on the total labor cost and the total material cost;
determining that the total cost of the medical laboratory service is different than a previous total cost of the medical laboratory service by a predetermined amount;
causing presentation of a user interface to notify that the total cost of the medical laboratory service is different than the previous total cost by the predetermined amount;
receiving an indication, via the user interface, to update a price of the medical laboratory service; and
automatically activating or deactivating one or more instruments associated with the medical laboratory service based at least in part on the total cost of the medical laboratory service, including:
communicating with the one or more instruments associated with the medical laboratory service to:
cause at least one of the one or more instruments to become active based at least in part on the total cost of the medical laboratory service being different than the previous total cost of the medical laboratory service by the predetermined amount; or
cause at least one of the one or more instruments to become inactive based at least in part on the total cost of the medical laboratory service being different than the previous total cost of the medical laboratory service by the predetermined amount;
wherein the labor costs are determined based at least in part on an amount of time to complete a number of the medical laboratory services over a predetermined time, divided by a number of the medical laboratory services completed over the predetermined time.

14. The method as recited in claim 13, further comprising:
sending instructions to one or more computing devices to at least one of:
order one or more materials for performing the medical laboratory service;
cause one or more instruments associated with the medical laboratory service to become active to perform the medical laboratory service; or
cause one or more instruments associated with the medical laboratory service to become inactive to cease performance of the medical laboratory service.

15. The method as recited in claim 13, wherein the predetermined amount is a percentage difference or a numerical difference.

16. The method as recited in claim 13, wherein causing presentation of the user interface includes sending a link by at least one of an email, a short message service (SMS) or a multimedia message service (MMS).

17. The method as recited in claim 13, further comprising:
receiving user input regarding the labor costs or the material costs;
and wherein determining the total cost of the medical laboratory service is based at least in part on the user input.

18. The method as recited in claim 13, further comprising:
determining the previous total cost of the medical laboratory service based at least in part on a number of medical laboratory services previously ordered over the predetermined time.

19. The method as recited in claim 13, wherein the total material cost of the medical laboratory service comprises at least one of a current acquisition cost of supplies used to perform the medical laboratory service or a cost of an amount of supplies used to calibrate the one or more instruments used to perform the medical laboratory service.

* * * * *